(12) United States Patent
Shepherd et al.

(10) Patent No.: US 8,484,627 B2
(45) Date of Patent: Jul. 9, 2013

(54) INTEROPERABILITY METHOD AND SOFTWARE

(75) Inventors: Bruce Shepherd, Angus (GB); John S. Byers, Dundee (GB)

(73) Assignee: NCR Corporation, Duluth, GA (US)

( * ) Notice: Subject to any disclaimer, the term of this patent is extended or adjusted under 35 U.S.C. 154(b) by 1094 days.

(21) Appl. No.: 12/012,167

(22) Filed: Jan. 31, 2008

(65) Prior Publication Data

US 2009/0199164 A1   Aug. 6, 2009

(51) Int. Cl.
*G06F 9/54*   (2006.01)

(52) U.S. Cl.
USPC ........... 717/136; 717/107; 717/108; 719/315; 719/316

(58) Field of Classification Search
CPC ...................................................... G06F 9/541
USPC .................. 717/107, 108, 136; 719/315, 316
See application file for complete search history.

(56) References Cited

U.S. PATENT DOCUMENTS

2003/0225935 A1* 12/2003 Rivard et al. .................. 709/328
2004/0103114 A1*  5/2004 Sesma ....................... 707/103 R
2005/0088427 A1*  4/2005 Kolmykov-Zotov et al. . 345/180

OTHER PUBLICATIONS

Syme, D.; Granicz, A.; Cisternino, A., "Expert F#" (Dec. 2007), pp. 491-522 [retrieved from http://link.springer.com/chapter/10.1007%2F978-1-4302-0285-1_17?LI=true#].*
Gordon, A., "The .NET and COM Interoperability Handbook" (2003), pp. 285-326, 658-661.*
Toelsen, A., "COM and .NET Interoperability" (2002), pp. 1-769.*

* cited by examiner

*Primary Examiner* — H S Sough
*Assistant Examiner* — Brian Wathen
(74) *Attorney, Agent, or Firm* — Joseph P. Merhle; Paul W. Martin

(57) ABSTRACT

Interoperability software modules comprise an architected .NET layer, an architected interpreter, an automatic interpreter and a library of COM objects. The architected interpreter where they are mapped to intermediate .NET interfaces compatible with the automatic interpreter by means of a Runtime Callable Wrapper (RCW). The architected interpreter also comprises an architected COM Callable Wrapper (CCW) that maps the intermediate COM interfaces into architected interfaces.

6 Claims, 2 Drawing Sheets

INTEROPERABILITY METHOD AND SOFTWARE

FIELD OF THE INVENTION

This invention relates to an interoperability method and software. More particularly, but not exclusively, it relates to an interoperability method and software that provides interoperability between a first, non-standard, software architecture and a second software architecture.

BACKGROUND OF THE INVENTION

The interoperability of standard .NET and COM software architectures is achieved using translation tools that reside over legacy COM libraries. The translation tools are run at design time. An example of a translation tool is TLBIMP. These design tools will generate an assembly containing the runtime callable wrapper (RCW) and COM callable wrapper (CCW) classes. A runtime callable wrapper (RCW) which allows a .NET object to call a COM object, and a COM callable wrapper (CCW) allows a COM to output to a .NET object.

During runtime application software will call the RCW and CCW classes directly.

However, many large businesses, for example financial institutions, have equipment that runs proprietary variants of the .NET and/or COM architectures. The output of the standard translation tools referred to above does not provide interface definitions suitable for interfacing with these proprietary architectures. In particular, the generation of .NET interfaces from COM components leads to interface definitions that are unsuitable for interfacing with proprietary .NET interfaces used by financial institutions. This difficulty in interoperability restricts the availability of legacy COM component libraries into systems operating proprietary .NET architectures.

Additionally, interface definitions generated using a standard translation tool contain fields and data that is not associated with a proprietary interface, these interface definitions appear confusing to a user having a detailed knowledge of the proprietary architecture.

SUMMARY OF THE INVENTION

According to a first aspect of the present invention there is provided an interoperability method comprising the steps of:
i) receiving interface definitions associated with one of: a first, non-standard, software architecture, a second software architecture
ii) generating interface definitions, corresponding to the interface definitions received in Step (i), in a format associated with the other of: the first, non-standard, software architecture, the second software architecture; and
iii) outputting the interface definitions generated in Step (ii).

The generation of intermediate interface definitions allows the seamless accessing of standard libraries of software routines by proprietary software, possibly using different software architecture.

Step (ii) of the method may comprise mapping the interface definitions received in Step (i) to the format associated with the other of: the first, non-standard, software architecture, the second software architecture Step (ii) of the method may comprise wrapping the interface definitions in one of the following: a runtime callable wrapper, a COM callable wrapper.

The first, non-standard, software architecture may comprise a proprietary .NET architecture. The interface definitions generated in Step (ii) may comprise intermediate interface definitions. The method may comprise mapping the intermediate interface definitions to interface definitions compatible directly with the second software architecture.

The method may comprise mapping interface definitions from the second software architecture to intermediate interface definitions prior to step (i). The method may comprise generating the intermediate interface definitions automatically from an interoperability tool kit associated with a software library. The software library may comprise at least one component generated using the second software architecture.

The second software architecture may comprise a non-standard software architecture. The second software architecture may comprise a COM architecture. The COM architecture may comprise a proprietary COM architecture.

According to a second aspect of the present invention there is software, which when executed upon a processor, causes the processor to:
i) receive interface definitions associated with one of: a first, non-standard, software architecture, a second software architecture
ii) generate interface definitions, corresponding to the interface definitions received in Step (i), in a format associated with the other of: the first, non-standard, software architecture, the second software architecture; and
iii) output the interface definitions generated in Step (ii).

The first, non-standard, software architecture may comprise a proprietary .NET architecture. The interface definitions generated in Step (ii) may comprise intermediate interface definitions. The software may cause the processor to map the intermediate interface definitions to interface definitions compatible directly with the second software architecture.

The software may cause the processor to map interface definitions from the second software architecture to intermediate interface definitions prior to step (i). The interface definitions mapped in step (i) may comprise the intermediate interface definitions. The software may cause the processor to generate the intermediate interface definitions automatically from an interoperability tool kit associated with a software library. The software library may comprise at least one component generated using the second software architecture.

The second software architecture may comprise a non-standard software architecture. The second software architecture may comprise a COM architecture. The COM architecture may comprise a proprietary COM architecture.

The software, when executed, may cause the processor to map the interface definitions received in Step (i) to the format associated with the other of: the first, non-standard, software architecture, the second software architecture The software, when executed, may, at Step (ii), cause the processor to wrap the interface definitions in one of the following: a runtime callable wrapper, a COM callable wrapper.

According to a third aspect of the present invention there is provided a data carrier embodying software which, when executed upon a processor cases the processor to execute a method according to the second aspect of the present invention According to a fourth aspect of the present invention there is provided a processor executing the software of the second aspect of the present invention.

According to a fifth aspect of the present invention there is provided an interoperability platform comprising software according to the second aspect of the present invention intercepts interface definitions from one of: a first non-standard software platform, an automated interpreter; and maps the interface definitions into a format compatible with the other of: a first non-standard software platform, an automated interpreter.

The software may be arranged to wrap the interface definitions in one of the following: a runtime callable wrapper, a COM callable wrapper.

The first, non-standard, software architecture may comprise a proprietary .NET architecture.

The automated interpreter may be arranged to map interface definitions received from the software into interface definitions compatible with a second software architecture, and vice versa.

The second software architecture may comprise a COM architecture. The COM architecture may comprise a proprietary COM architecture.

BRIEF DESCRIPTION OF THE DRAWINGS

Embodiments of the present invention will now be described, by way of example only, with reference to the accompanying drawings, in which.

DETAILED DESCRIPTION

Figure 1:
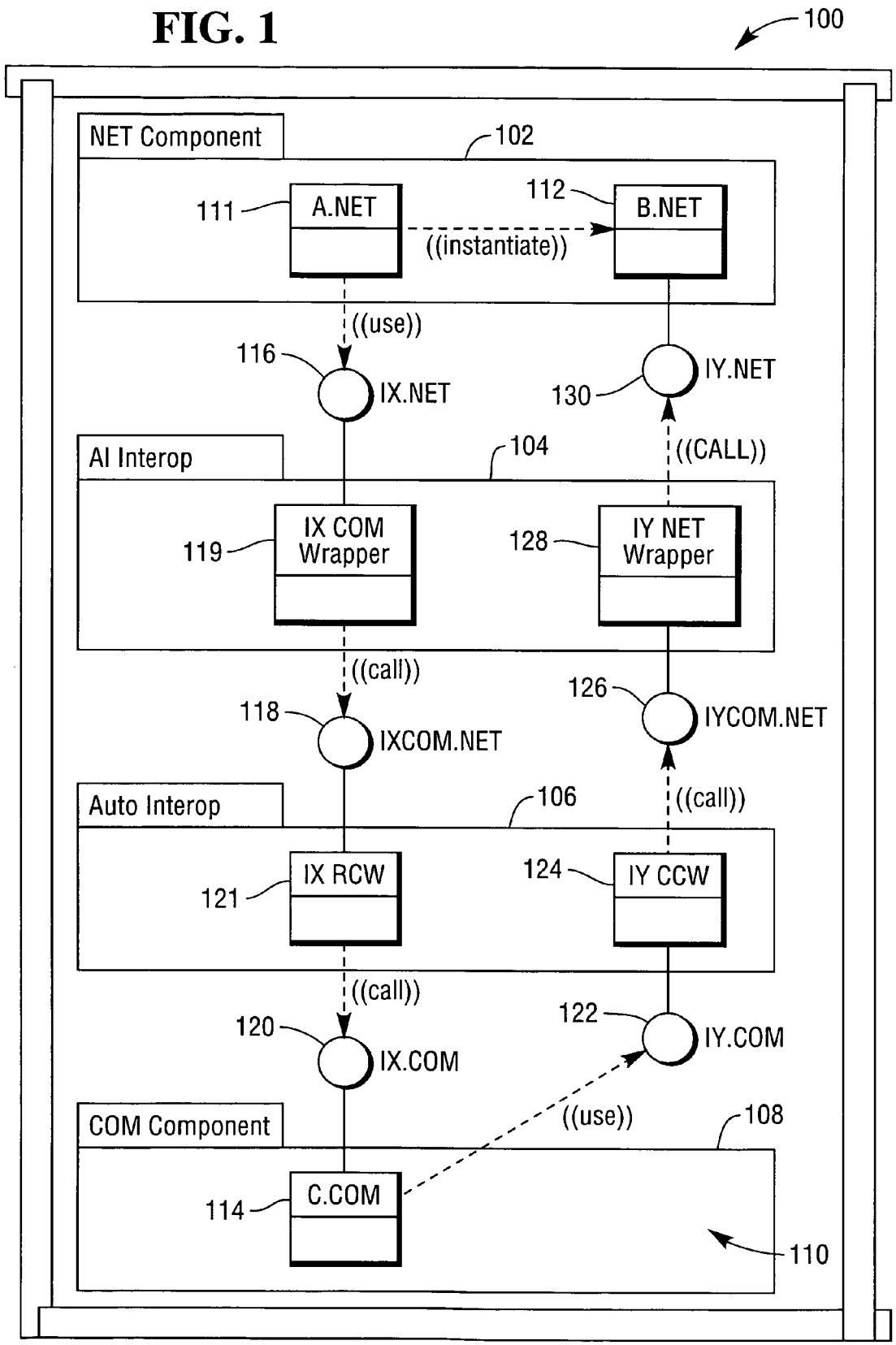
FIG. 1 is a schematic representation software modules involved in an embodiment of an interoperability method according to an aspect of the present invention, including an embodiment of software according to an aspect of the present invention.

Referring now to FIG. 1, interoperability software modules 100 comprise an architected .NET layer 102, an architected interpreter 104, an automatic interpreter 106 and a library 108 of COM objects 110. Typically, the architected .NET layer 102 is a non-standard, usually a proprietary, software operating platform based upon the standard .NET operating platform.

The automatic interpreter 106 sits over the library 108 of COM objects 110.

A process 111, "A.NET", running on the architected .NET layer 102 instantiates a second process 112, "B.NET". The second process 112 "B.NET" requires a routine 114 that is defined as a COM object 110 stored in the library 108 in order to execute properly.

The process 111 "A.NET" requests the invocation of the routine 114 upon instantiation of the second process 112 "B.NET". This request comprises assemblies comprises architected .NET object classes and architected .NET interfaces 116. The object classes are called into by the .NET layer 102. However, the architected .NET interfaces 116 pass to the architected interpreter 104 where they are mapped to intermediate .NET interfaces 118 compatible with the automatic interpreter 106 by means of a RCW 119.

For example, an architected .NET signature for an event may have the format:
   eventName (object sender, EventArgs args) where args is a class containing the event parameters.

The architected .NET signature interfaces 116 are mapped to intermediate signature interfaces 118 in a format suitable for interpretation by the automatic interpreter, for example in the form:
   eventName (int param1, char param2, string param3)

The intermediate interfaces 118 "IXCOM.NET" pass to the automatic interpreter 106 where they are mapped to COM interfaces 120 "IX.COM" by a further RCW 121. The COM interfaces 120 are used in the calling of the COM object 110. The COM object 110 carries out its function and returns an output to the automatic interpreter 106 using COM interfaces 122 "IY.COM". The automatic interpreter generates a COM call wrapper (CCW) 124 that maps the COM interfaces 122 to intermediate COM interfaces 126 "IYCOM.NET". The intermediate COM interfaces 126 pass to the architected interpreter 104 where an architected CCW 128 maps the intermediate COM interfaces 126 into architected interfaces 130 "IY.NET".

The architected interfaces 130 pass to the .NET layer 102 where the output of the COM object 110 is received by the second .NET process 112.

Figure 2:
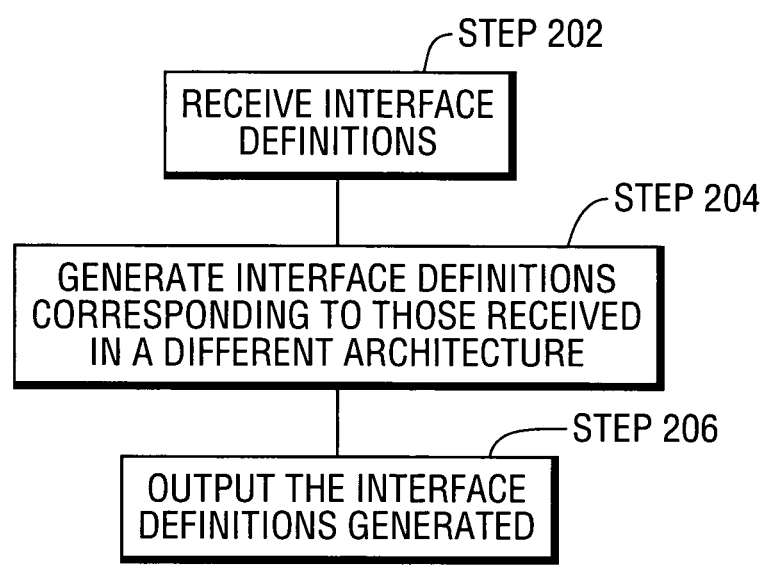
FIG. 2 is a schematic flow chart showing the steps of an embodiment of an interoperability method according to an aspect of the present invention.

Referring now to FIG. 2, an interoperability method comprises the steps of receiving interface definitions associated either of a first, non-standard, software architecture or a second software architecture. (Step 202). The interface definitions may not be received directly from an object or routine executed in the first or second software architectures but may be intermediate interface definitions received from an intermediate layer that alters them, for example an automatic interpreter that sits over a library of routines or objects.

Interface definitions, corresponding to the received interface definitions are generated in a format associated with the other of the first, non-standard, software architecture or the second software architecture (Step 204). The generated interface definitions may not be formatted for direct interaction with an object or routine in the respective first or second software architectures but may be intermediate interface definitions formatted for interaction with an intermediate layer, such as an automatic interpreter.

The generated interface definitions are output (Step 206).

It will be appreciated that although described with respect to a scenario where only one of the software operating platforms is a non-standard, typically proprietary software operating platform, both of the software operating platforms may be non-standard, and typically proprietary.

It will be further appreciated that both RCWs and CCWs may be implemented via script engines.

Various modifications may be made to the above described embodiment within the scope of the invention without departing from the spirit of the invention.

The invention claimed is:

1. A method residing and implemented in a non-transitory computer-readable storage medium for execution on a processor, the processor when executed performing the method, comprising:

receiving, by the processor, interface definitions associated with one of: a non-standard first-software architecture and a non-standard second software architecture as an interpreter processes the interface definitions on the processor;

translating, by the processor, the interface definitions, via the interpreter, the interface definitions translated to a format different from a particular format in which the interface definitions were received, the interface definitions in an intermediate format for accessing libraries of proprietary software that is a different software architecture from that which is associated with the non-standard first-software architecture and the non-standard second software architecture, and the interface definitions generated from an interoperability toolkit associated with the libraries;

wherein translating further includes wrapping, by the processor, the interface definitions in a runtime callable wrapper and a COM callable wrapper; and outputting, by the processor, the interface definitions that were translated.

2. The method of the claim 1, wherein the interface definitions translated comprise intermediate interface definitions.

3. The method of the claim 1 further comprising, mapping, by the processor, the intermediate interface definitions to the interface definitions directly with the second software architecture.

4. The method of the claim 1 further comprising, mapping, by the processor, the interface definitions from the second software architecture to intermediate interface definitions prior to receiving the interface definitions.

5. The method of the claim 4, wherein the interface definitions mapped comprise the intermediate interface definitions.

6. The method of the claim 1, wherein translating further comprises, mapping, by the processor, the interface definitions received to a particular format associated with the other of: the first software architecture and the second software architecture.

* * * * *